(12) United States Patent
Chidambaran

(10) Patent No.: US 6,327,606 B1
(45) Date of Patent: Dec. 4, 2001

(54) MEMORY MANAGEMENT OF COMPLEX OBJECTS RETURNED FROM PROCEDURE CALLS

(75) Inventor: Lakshminarayanan Chidambaran, Fremont, CA (US)

(73) Assignee: Oracle Corp., Redwood Shores, CA (US)

( * ) Notice: Subject to any disclaimer, the term of this patent is extended or adjusted under 35 U.S.C. 154(b) by 0 days.

(21) Appl. No.: 09/103,548

(22) Filed: Jun. 24, 1998

(51) Int. Cl.[7] ............................................. G06F 9/00
(52) U.S. Cl. ............................... 709/104; 711/1; 711/5; 707/101
(58) Field of Search ............................... 709/100, 101, 709/102, 103, 104, 105, 106, 107, 108, 310, 313, 316; 707/100, 101; 711/1, 5, 102, 103

(56) References Cited

U.S. PATENT DOCUMENTS

| | | | |
|---|---|---|---|
| 5,542,078 | * 7/1996 | Martel | 707/101 |
| 5,548,749 | * 8/1996 | Kroenke et al. | 707/102 |
| 5,566,333 | * 10/1996 | Olson | 707/102 |
| 5,596,746 | * 1/1997 | Shen et al. | 707/101 |
| 5,615,302 | * 3/1997 | Jensen et al. | 707/103 |
| 5,649,139 | * 7/1997 | Weinreh et al. | 711/202 |
| 5,652,882 | * 7/1997 | Doktor | 707/201 |
| 5,742,793 | * 4/1998 | Sturges et al. | 711/152 |
| 5,822,590 | * 10/1998 | Gupta | 717/5 |
| 5,838,977 | * 11/1998 | Gupta | 717/5 |
| 6,047,280 | * 4/2000 | Ashby et al. | 707/2 |

* cited by examiner

Primary Examiner—Majid A. Banankhah
(74) Attorney, Agent, or Firm—Ditthavong & Carlson, P.C

(57) ABSTRACT

A method and computer-readable medium for managing memory for complex objects returned from procedure calls are described. Memory for complex objects returned from procedure calls is allotted from memory pools, which are allocated on a "per-call" basis for complex objects. Complex objects allotted from different memory pools can have overlapping lifetimes. The memory used by the complex object is straightforwardly released by deallocating the memory pool. In one aspect, the memory management of complex objects is located in the called procedures, which may be an automatically generated client stub routine for a remote procedure call.

26 Claims, 7 Drawing Sheets

MEMORY MANAGEMENT OF COMPLEX OBJECTS RETURNED FROM PROCEDURE CALLS

RELATED APPLICATIONS

This application is related to the commonly assigned, U.S. patent application Ser. No. 09/103,547, entitled "Memory Management of Complex Objects within a Database System," filed on Jun. 24, 1998 by Lakshminarayanan Chidambaran, Srinath Krishnaswamy, and Joyo Wijaya, the contents of which are hereby incorporated by reference herein.

FIELD OF THE INVENTION

The present invention relates to computer systems and more particularly to memory management techniques for complex objects returned from a procedure call.

BACKGROUND OF THE INVENTION

A complex object is an instance of a data type or objected-oriented class that contains zero or more scalar attributes (e.g. integers, characters, etc.) and one or more attributes that can point to or reference other complex objects. An attribute capable of pointing to or referencing another object is referred to herein as a "pointer." Thus, a complex object may be mapped to a top-level data structure with one or more pointers to other data structures that in turn may have pointers to other data structures. Examples of complex objects include linked lists, trees, and graphs.

Memory to store complex objects is typically dynamically allocated from an area of memory available to a program called a "heap." More specifically, each data structure in the complex object, including the complex objects to which the complex object has pointers, is individually allocated from the heap and referenced by a pointer. Thus, a top-level data structure of a complex object includes pointers to second-arily allocated data structures. When a complex object is no longer needed by the program, the individually allocated data structures of the complex object are deallocated or "freed" to allow the memory currently being used to store the complex object to be recycled (i.e. to be made available for other purposes). Thus, freeing a complex object involves freeing each allocated data structure belonging to the complex object.

A routine is a self-consistent set of computer instructions for performing particular tasks. Routines are also known as procedures, functions, and subroutines. The computer instructions can be low-level machine language instructions or high-level instructions in a programming language such as a C or C++ that are ultimately translated into machine language instructions, for example, by compiling or interpreting. Calling or invoking a routine involves passing arguments to the routines, if necessary, and causing the instructions to be executed. A routine may also return one or more results to the calling routine, and these results can be complex objects. Non-complex objects have a predetermined size, and space to hold the returned results of non-complex objects is reserved on the stack frame or register set for the calling routine. Memory management for stack-based objects is straightforward because the entire stack frame for a routine is automatically deallocated when execution of the routine is finished (i.e. when the routine "returns"). Thus, simple, stack-based objects do not need to be deallocated explicitly.

Complex objects, on the other hand, usually do not have a predetermined size; thus, complex objects that are returned from a routine are dynamically allocated from heap memory. The dynamic memory allocation may be performed by a vendor-supplied operating system or run-time library call, such as malloc(3) on Unix operating system platforms, or by a user-supplied memory allocation routine that ultimately makes an independent call to a vendor-supplied memory allocation routine. This type of memory allocation typically results in the dispersion of a complex object over many non-contiguous areas of the heap, because, after many allocations and deallocation, the heap is fragmented. For example, in FIG. 6, a call to routine "f" in step 600 causes a complex object "p" to be returned. Complex object "p" comprises five non-contiguous areas of memory in heap 610, each labeled "p." In addition, a subsequent call to routine "g" in step 602 causes complex object "q" to be returned, consuming four non-contiguous areas of memory in the heap. Heap 612 illustrates the heap 610 after memory has been allocated for complex object "q".

Unlike the memory occupied by the stack frame, which is automatically deallocated upon a routine's return, heap-allocated memory for a complex object must be explicitly deallocated when the complex object is no longer needed by the program. This deallocation typically involves traversing the structure of the complex object by following pointers stored in the various data structures that make up the complex object. These pointers are followed to locate and deallocate the various non-contiguous areas of the heap used to store the data structures belonging to the complex parameter.

Since traversing a complex data structure is type-dependent, a deallocation routine is written for each complex object. Referring again FIG. 6, the complex object "p" is deallocated by calling a type-specific deallocation routine called "P_free( )" with the complex object "p" passed in as a parameter. In response, the complex object "p" is traversed and each of the dynamically alloacted memory areas that belong to "p" are freed (step 604). Heap 614 illustrates the state of heap 612 after memory for "p" is no longer allocated. Likewise, complex object "q" is deallocated by calling a different "Q_free( )" routine in step 606. The "Q_free( )" routine traverses the data structures of complex object "q" and frees the individually allocated memory areas of the complex object. Heap 616 illustrates heap 614 after complex object "q" has been deallocated. Therefore, this "per-object" deallocation approach can be computationally expensive, and the computational cost for performing deallocation for a complex object increases with the complexity of the object.

A "per-client" memory management approach that may reduce the computational expense in deallocating complex objects is available in the Distributed Computing Environment (DCE) defined by the Open Software Foundation (OSF). According to this approach, the following function call is made before calling client stub routines that return complex objects: rpc_ss_set_client_alloc_free(rpc_ss_allocate, rpc_ss_free);

When called, this routine instantiates a new dynamic memory management system for the process and registers new memory allocation and deallocation routines. When the called client stub routines return complex objects, the client stub routines invoke the registered memory allocation routine, rpc_ss_allocate, to dynamically allocate memory for the complex objects within the new memory management system. When all of the complex objects are no longer needed outside the client stub routines that created them, the entire new memory management system may be torn down, releasing all the memory allocated for the complex objects.

This process may be performed by a rpc_ss_disable_allocate( ) function call.

Referring the FIG. 7, a new memory management system is instantiated by calling the enable routine in step 700, which registers an appropriate memory allocation routine for the new memory management system and sets up an area 720 in heap 710 for allocating memory. In step 702, when complex object "p" is returned from function "f", memory for complex object "p" is allocated by the registered memory allocation routine from memory area 720 as shown in heap 712. When function "g" is called in step 704, memory for complex object "q" is also allocated from memory area 720 as shown in heap 714. Finally, after both complex object "p" and complex object "q" are no longer needed, the new memory management system can be disabled in step 706, releasing the memory for all the allocated memory, including complex objects "p" and "q". Heap 716 depicts heap 714 after the disable call routine is executed.

Although the process of tearing down the memory management system to release the memory for all the allocated complex objects can be less computationally expensive than the "per-object" deallocation approach, the "per-client" approach is less flexible, because different complex objects typically have different and overlapping lifetimes. The lifetime of a complex object is the period from the creation of the complex object until the last use of the complex object. For example, referring back to FIG. 7, the lifetime 732 of complex object "q" commences at step 704 and ends when it is no longer needs at step 706, where it can be safely deallocated. In this example, the lifetime 730 of complex object "p" commences at step 702, extends beyond the creation of complex object "q" in step 704, and ends some time before the end of the lifetime 732 of complex object "q". Consequently, the lifetime 730 of complex object "p" overlaps the lifetime 732 of complex object "q" because complex object "q" was created after complex object "p" was created but before complex object "p" was terminated.

In this situation, the "per-client" memory management system cannot be taken down at the end of the lifetime 730 of complex object "p" because deallocation of memory area 720 will prematurely release the allocated memory for complex object "q". In contrast, the "per-object" deallocation allows the complex object to be freed at the end of its lifetime. Referring again to FIG. 6, complex object "p" is freed in step 604 at the end of its lifetime 620, and complex object "q" is freed in step 606 at the end of its lifetime 622.

One conventional attempt to handle overlapping lifetimes is convert a complex object from a "per-client" memory management approach to a "per-object" memory management approach. Accordingly, the complex object is cloned from the "per-client" memory management area into a more persistent area of the heap by performing a deep copy operation on the complex object. A deep copy, however, is a computationally expensive operation because the complex object data structure needs to be traversed to visit every node in the complex object for copying. Furthermore, freeing the cloned complex object requires the expensive traversal of the complex object as in the "per-object" approach. Consequently, the conscientious programmer is faced with a dilemma: either defer the deallocation of the memory for complex object "p", thereby wasting memory resources, or deallocate complex object "p" according to the "per-object" approach and incur the computational overhead of traversing the data structures and pointers of complex object "p".

Another problem with the "per-client" approach is that it is error-prone. There are several operations an application programmer must code for every procedure call that returns complex objects, and it is easy to overlook or miscode one of the operations, resulting in a bug that causes the program to malfunction. For example, the application programmer may instantiate a new memory management system without realizing that another memory management system is in effect, thereby causing the previously allocated memory to be lost. Memory allocation errors are usually very subtle and are some of the most difficult bugs to diagnose and fix.

Therefore, there is a need for a memory management system and methodology that avoids the computational costs in traversing complex objects present in the conventional "per-object" deallocation approach while avoiding the loss of flexibility incurred by using the "per-client" deallocation approach. There is also a need for reducing bugs in implementing a memory management system.

SUMMARY OF THE INVENTION

These and other needs are addressed by the present invention by allocating pools of dynamic memory on a "per-call" basis for complex objects returned from respective procedure calls. By allotting memory for the complex object from an allocated memory pool, the memory used by the complex object is easily released by deallocating the memory pool, thereby avoiding the computational expense in traversing complex data structures. This "per-call" approach is more flexible than the "per-client" approach, because the separate memory pools for complex objects returned from different procedure calls are separately deallocated.

Accordingly, one aspect of the invention relates to a computer-implemented method and a computer-readable medium bearing instructions for managing memory for dynamically allocated complex objects. The complex objects are created as a result of remote procedure calls. Pools of dynamic memory are allocated, corresponding to one or more of the remote procedure calls. Memory for said complex objects is allotted so that each complex object is allocated memory within a pool that corresponds to the remote procedure that resulted in creation of the complex object. Memory for the complex objects is released by deallocating the pools within which the complex objects were allocated. The lifetime of one of the complex objects created in response to one of the remote procedure calls overlaps the lifetime of another complex object created as a result of another remote procedure call. Allocation of pools of dynamic memory corresponding to one or more remote procedure calls enables both efficient and flexible memory deallocation of complex objects.

Another aspect of the invention involves a computer-implemented and a computer-readable medium bearing instructions for managing memory for dynamically allocated complex objects. When a first routine is executed, a first pool of dynamic memory is allocated, memory from the first pool is allotted for a first complex object, and the first complex object is returned. Similarly, when a second routine is executed, a second pool of dynamic memory, other than the first pool, is allocated, memory from the second pool is allotted for a second complex object, and the second complex object is returned. Memory for the first complex object and the second complex object is release by deallocating the first pool and the second pool, respectively. By locating the memory management functions in the routine that returns the complex object rather outside the routine, errors can be reduced because the memory management functionality is coded once per routine rather than once per invocation of the routine.

Still another aspect of the invention relates to automatically coding the memory management functionality in the context of a remote procedure call system, thereby reducing the opportunity for human error in coding the memory management instructions. Specifically, a computer-implemented method and computer-readable medium bearing instructions for translating a description of an interface for a remote procedure call are provided. A client stub routine for said remote procedure call is automatically generated based on the description. The client stub routine includes instructions for allocating a pool of dynamic memory, allotting memory from the pool for a complex object, and returning the complex object. A memory deallocation routine including instructions for deallocating said pool is provided.

Still other objects and advantages of the present invention will become readily apparent from the following detailed description, simply by way of illustration of the best mode contemplated of carrying out the invention. As will be realized, the invention is capable of other and different embodiments and its several details are capable of modifications in various obvious respects, all without departing from the invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A method and apparatus are described for memory management of complex objects. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Figure 1:
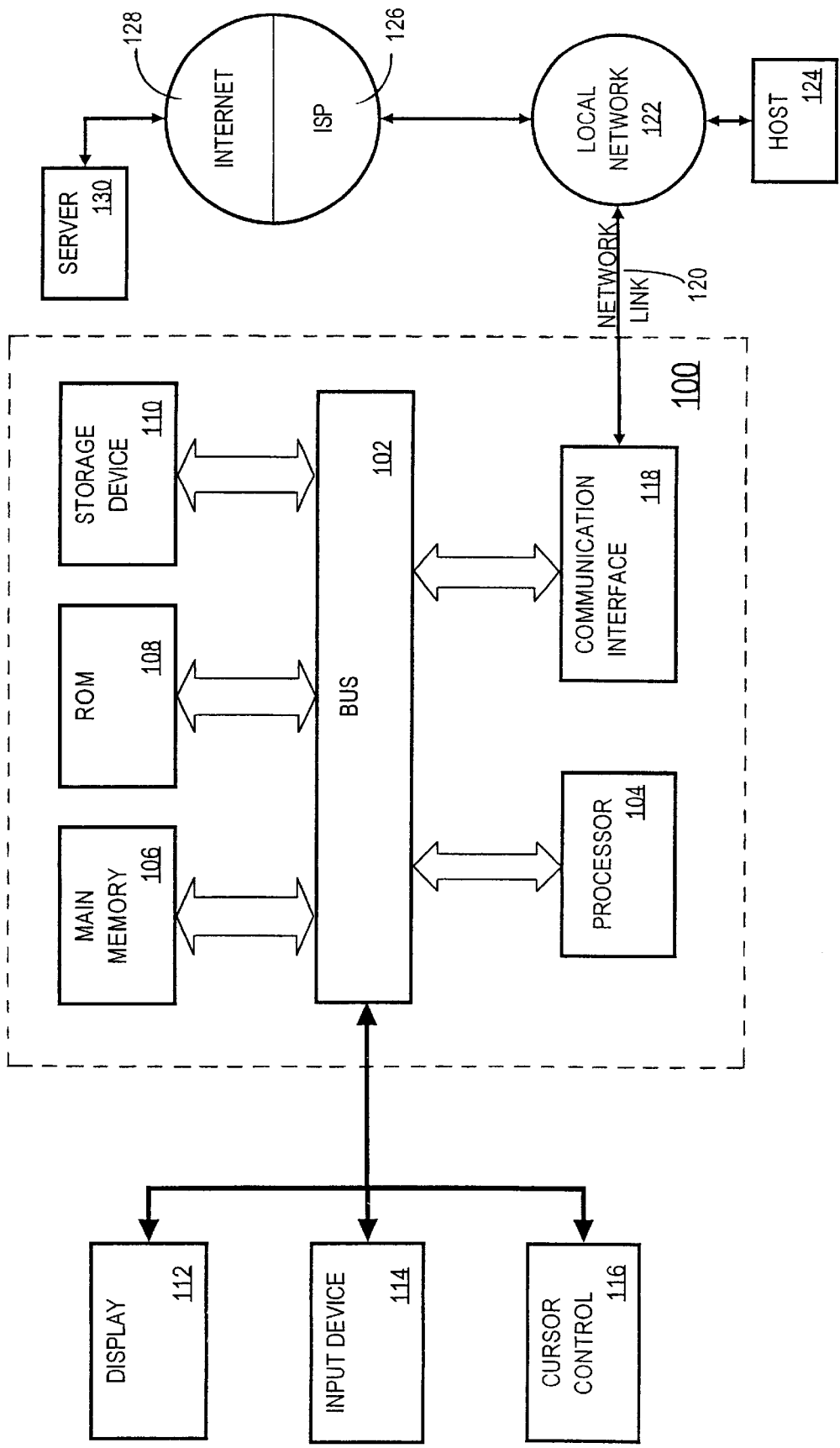
FIG. 1 is a high-level diagram that can be used to implement the present invention.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for memory management of complex objects. According to one embodiment of the invention, memory management of complex objects is provided by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. In accordance with the invention, one such downloaded application provides for memory management of complex objects as described herein.

The received code may be executed by processor 104 as it is received, and/or stored in storage device 110, or other non-volatile storage for later execution. In this manner, computer system 100 may obtain application code in the form of a carrier wave.

Per-Call Memory Pools

In accordance with one aspect of the invention, memory for complex objects returned from a procedure call is maintained in pools of dynamic memory on a "per-call" basis. That is, with each call that requires the allocation of memory for a complex object, a corresponding memory pool is created. After it has been created, the memory pool created for a particular routine call may be located, for example, through a pointer returned by the called procedure. A deallocation routine is provided for deallocating all complex objects that belong to a given memory pool. This deallocation is performed on a memory pool basis, thus avoiding the need to traverse the structures of the objects that belong to the memory pool.

Figure 2:
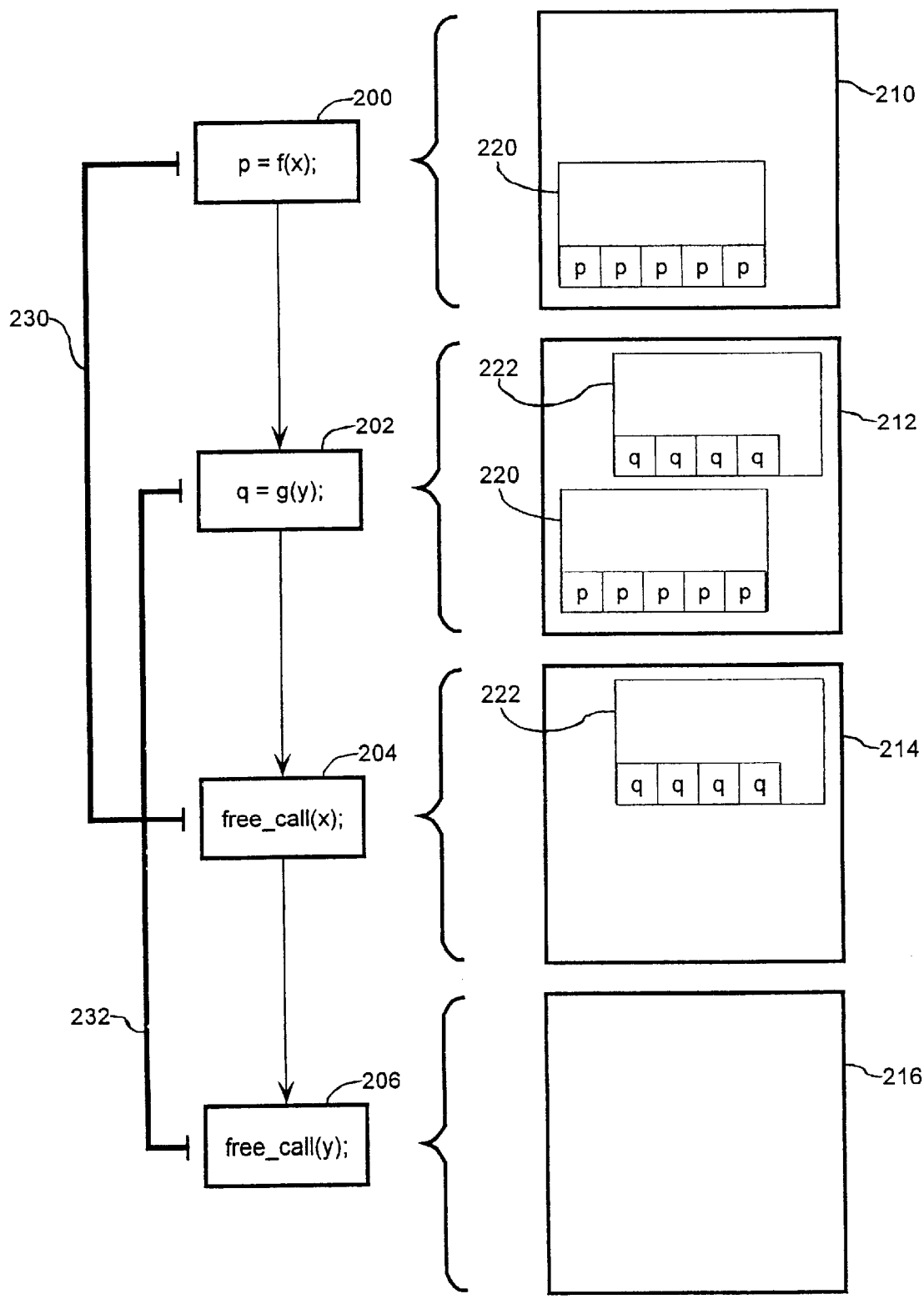
FIG. 2 depicts a sequence of memory allocations and deallocation and a corresponding heap in accordance with one embodiment.

Referring to FIG. 2, a call to routine "f" in step 200 causes a corresponding pool 220 of dynamic memory from heap 210 to be allocated. In one embodiment, the association between this call to routine "f" and corresponding pool 220 is maintained by a reference that points to pool 220. The reference to pool 220, labeled "x" in FIG. 2, can be kept in a call context data structure initialized by routine "f". When complex object "p" is created within routine "f", memory from pool 220 is allotted to store the various data structures that complex object "p" comprises. FIG. 2 depicts, as an example, five memory areas labeled "p" have been allotted in heap 210 for complex object "p". While the present invention is not limited to any particular method of allotting memory from a memory pool, one method of allotment is described in more detail hereinafter.

At step 202, a call to routine "g" causes another pool 222 to be created and a reference "y" thereto to be set. Memory for complex object "q" is allotted from pool 222. Heap 212 depicts heap 210 after four areas of memory labeled "q" have been allocated for complex object "q" within pool 222. When routine "g" terminates it returns complex object "q" to the calling routine. At this point, the lifetime 230 of complex object "p" and the lifetime 232 of complex object "q" overlap, because the memory pool 222 for complex object "q" was allocated after the memory pool 220 for complex object "p" but before memory pool 220 is deallocated. Since, at this point, memory for complex object "p" and memory for complex object "q" were allotted from different pools 220 and 222, memory for one of those complex objects can be released by deallocating the corresponding pool 220 or 222 without prematurely releasing the memory for the other complex object.

At the end of the lifetime 230 of complex object "p", it is desirable to release the memory for complex object "p" to reduce memory usage. Accordingly, step 204 is a call to a routine to deallocate a referenced pool of memory. In this example, reference "x" for deallocation routine "free_call( )" indicates pool 220. Accordingly, pool 220 is deallocated, releasing all the memory allotted therein, i.e. memory for complex object "p" as shown in heap 214. Thus, memory allocated for complex object "p" is now available for other purposes, fostering a reduction in unnecessary memory usage. Since memory for complex object "q" was not allotted from pool 220, the deallocation of pool 220 in step 204 does not adversely and prematurely release memory for complex object "q". Accordingly, complex object "q" can be used until the end of its lifetime 232. At the end of the lifetime 232 of complex object "q", routine "free_call( )" is called with reference "y" that indicates pool 222 (step 206). Accordingly, pool 222 is deallocated, releasing memory consumed by complex object "q" and resulting in heap 216.

Therefore, employment of a memory pool for complex objects on a per-call basis allows memory to be managed more flexibly than the "per-client" memory management approach. Although "per-call" memory allocation has been illustrated with a single complex object out-parameter, it is to be understood that a routine can return a plurality of complex objects and all the memory for these complex objects is allotted from the same pool associated with the invocation of the routine. Furthermore, a routine may be called multiple times, yet each time the routine is called, a separate pool may be allocated, since the lifetime of the complex objects returned from the various calls differ and may or may not overlap.

Allotting Memory from a Per-Call Memory Pool

The present invention is not limited to any particular implementation of memory pools, although it is generally preferable to implement the memory pools with a data structure that is easy to traverse, such as a linked list of memory chunks. These memory chunks are obtained from the heap on an as needed basis. On many computer systems, an operating system or run-time library call to allocate additional dynamic memory is fairly expensive. Thus, allocating chunks of a minimum size such as 10 kb or 32 kb amortizes the cost of the dynamic allocation over many allotments of memory for the data structure.

In some applications, instantiating a complex object involves many requests for memory allocations of a particular size. For example, a B-tree typically includes many branch nodes, each of which uses the same amount of memory. To exploit this clustering of memory allocations for a particular size, some implementations subdivide each memory pool for handling memory requests for different size. Accordingly, one embodiment implements a memory pool with a table of linked lists of memory chunks, in which each entry in the table corresponds to a predefined range of memory allocations. For example, one entry includes a linked list for memory requests under 8 bytes, another entry for memory requests between 9 and 16 bytes, a third entry for memory requests from 17 to 32 bytes, etc.

Figure 3:
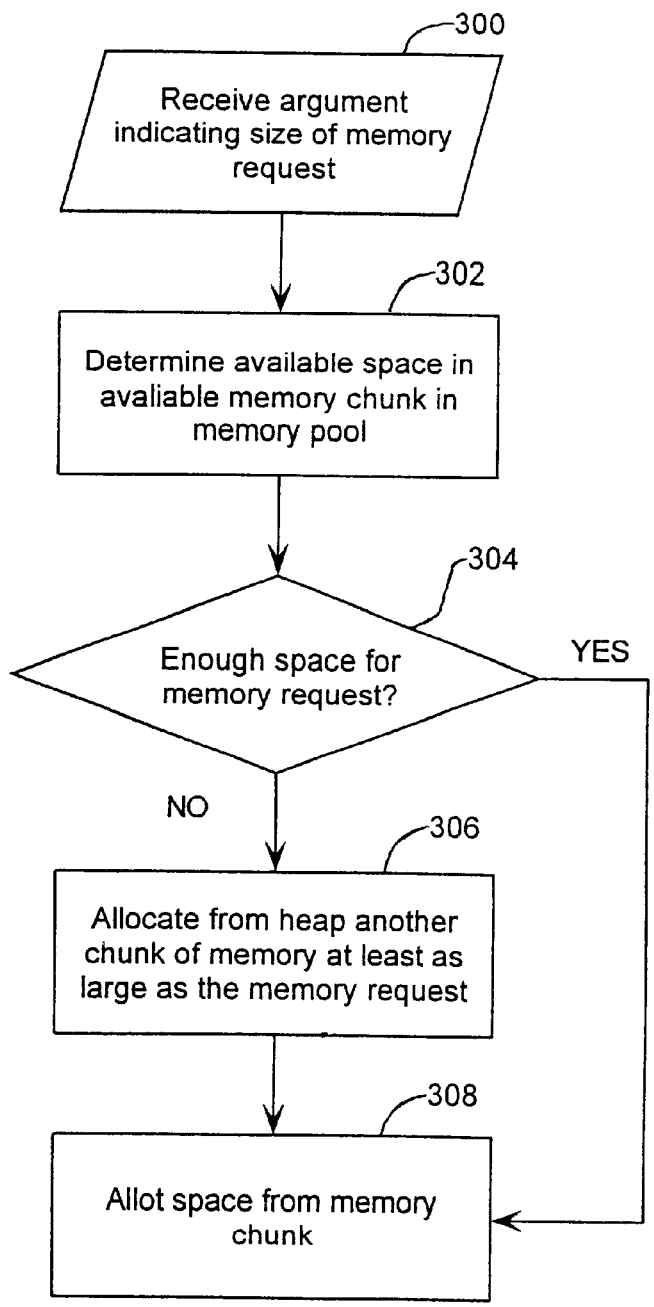
FIG. 3 is a flowchart showing an operation of allotting memory from an allocated memory pool according to one embodiment.

FIG. 3 is a flowchart showing one way to allot memory for a complex object from a memory pool, maintained in part as a linked list of memory chunks. At least one of the memory chunks is only partially allotted, and the memory pool maintains a value that indicates the start of available space in the memory. The start of available space in the memory chunk value can be a pointer within the memory chunk and an offset from the beginning of the memory chunk.

When the memory allotment routine receives an argument indicating how much memory is being requested (step 300), the available space in a partially filled memory chunk is calculated (step 302). There are various techniques for making this calculation. For example, if the size of the entire memory chunk is known, then the available space can be determined by subtracting the size from the starting offset. If there is not enough space for the memory request (tested in step 304), then another chunk of memory at least as large as the memory request is allocated from the heap (step 306) and space is allotted from the memory chunk (step 308). On the other hand, if there is enough space for the memory request (tested in step 304), then execution skips to step 308 where the space is allotted from the memory chunk for the request.

Therefore, in accordance with one aspect of the invention, the memory pools are maintained as one or more linked lists of memory chunks. Since linearly traversing a linked list is a straightforward procedure, memory can be released without incurring a high computational cost associated with traversing very complex objects. For example, the number of pointer dereferences will typically be much greater when individually freeing complex objects than when freeing the linked list of memory chunks.

Remote Procedure Calls

Figure 4:
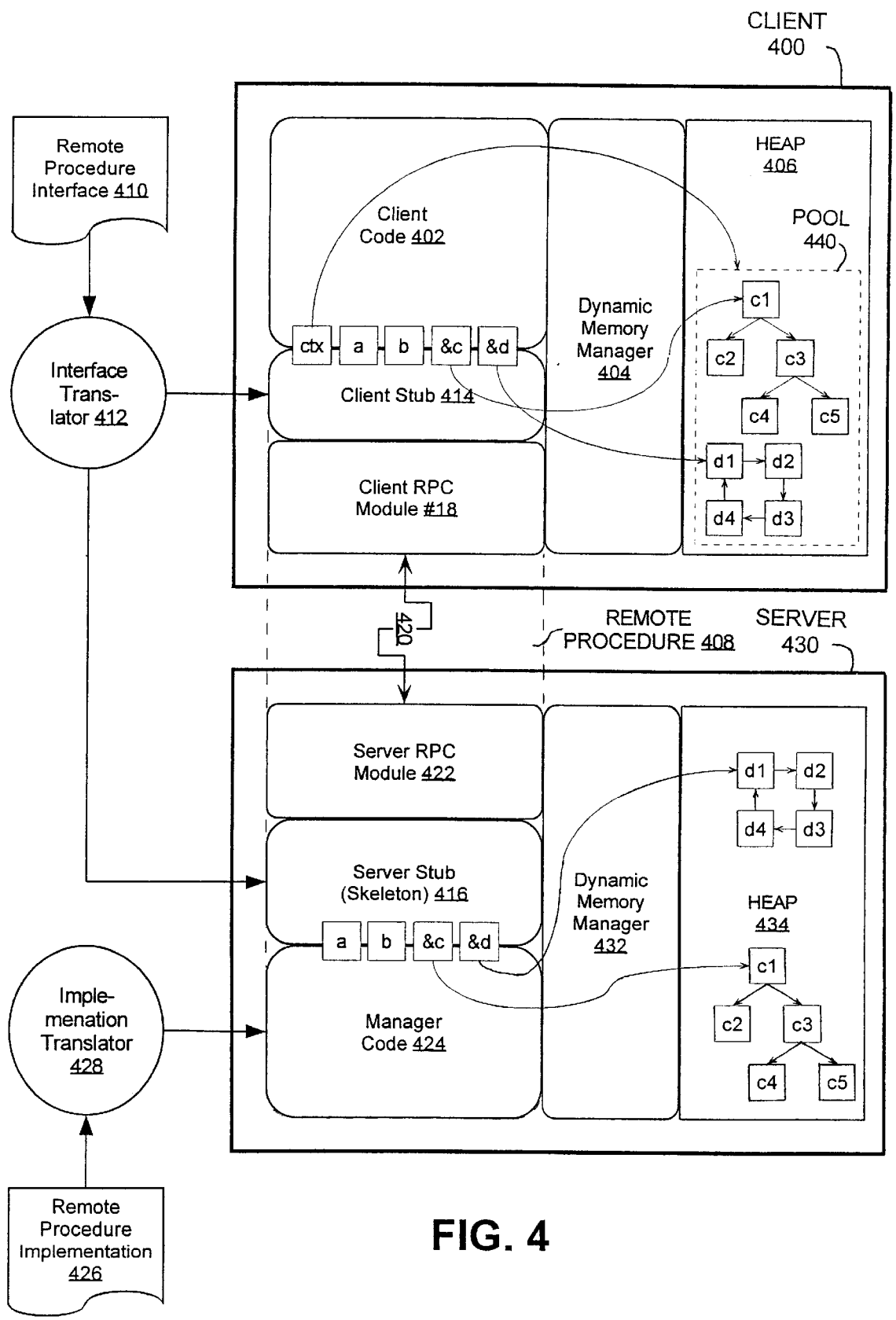
FIG. 4 illustrates an architecture for implementing a remote procedure call that returns a complex object.
Figure 5:
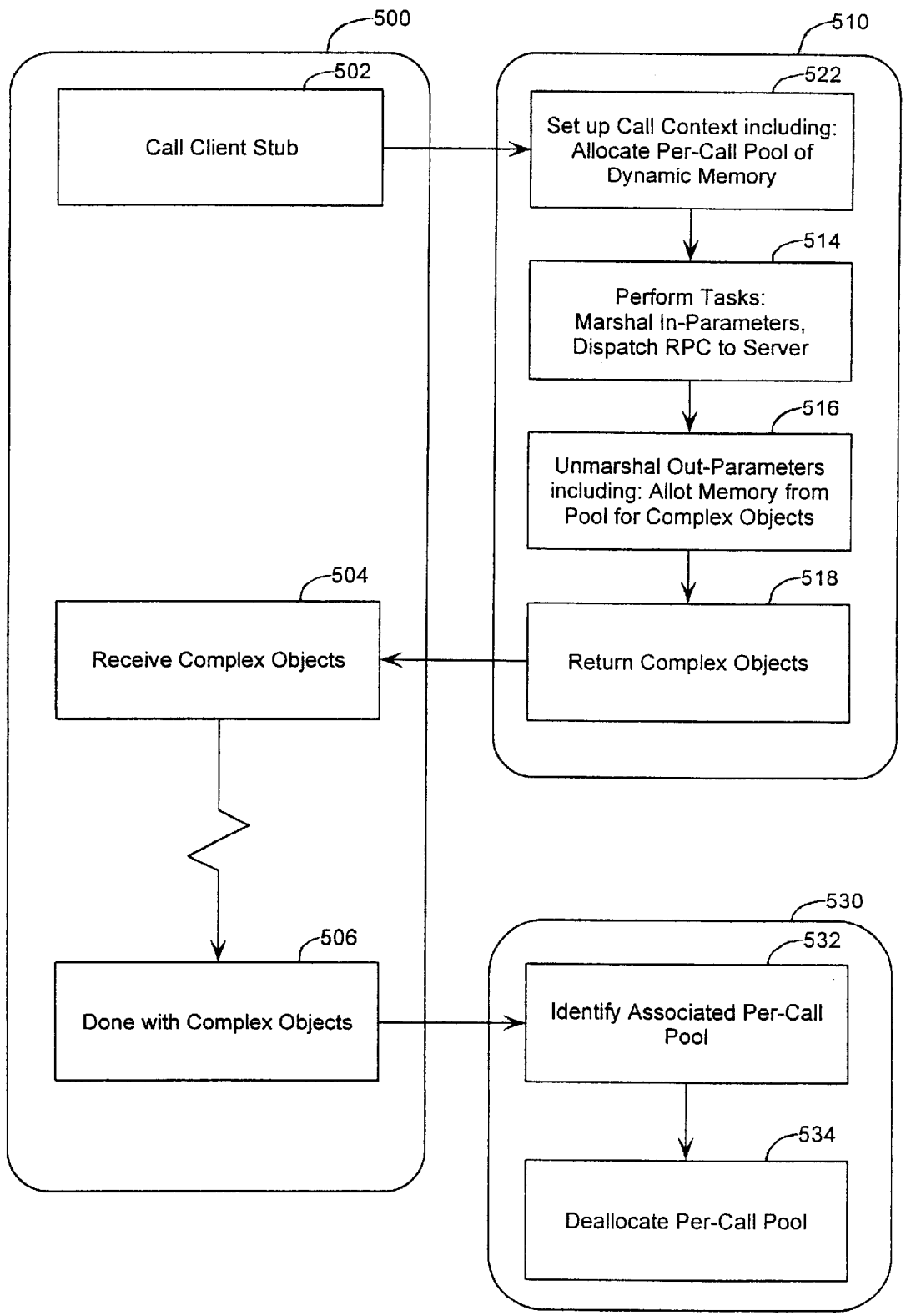
FIG. 5 is a flowchart showing an operation of routines involved in a remote procedure call.
Figure 6:
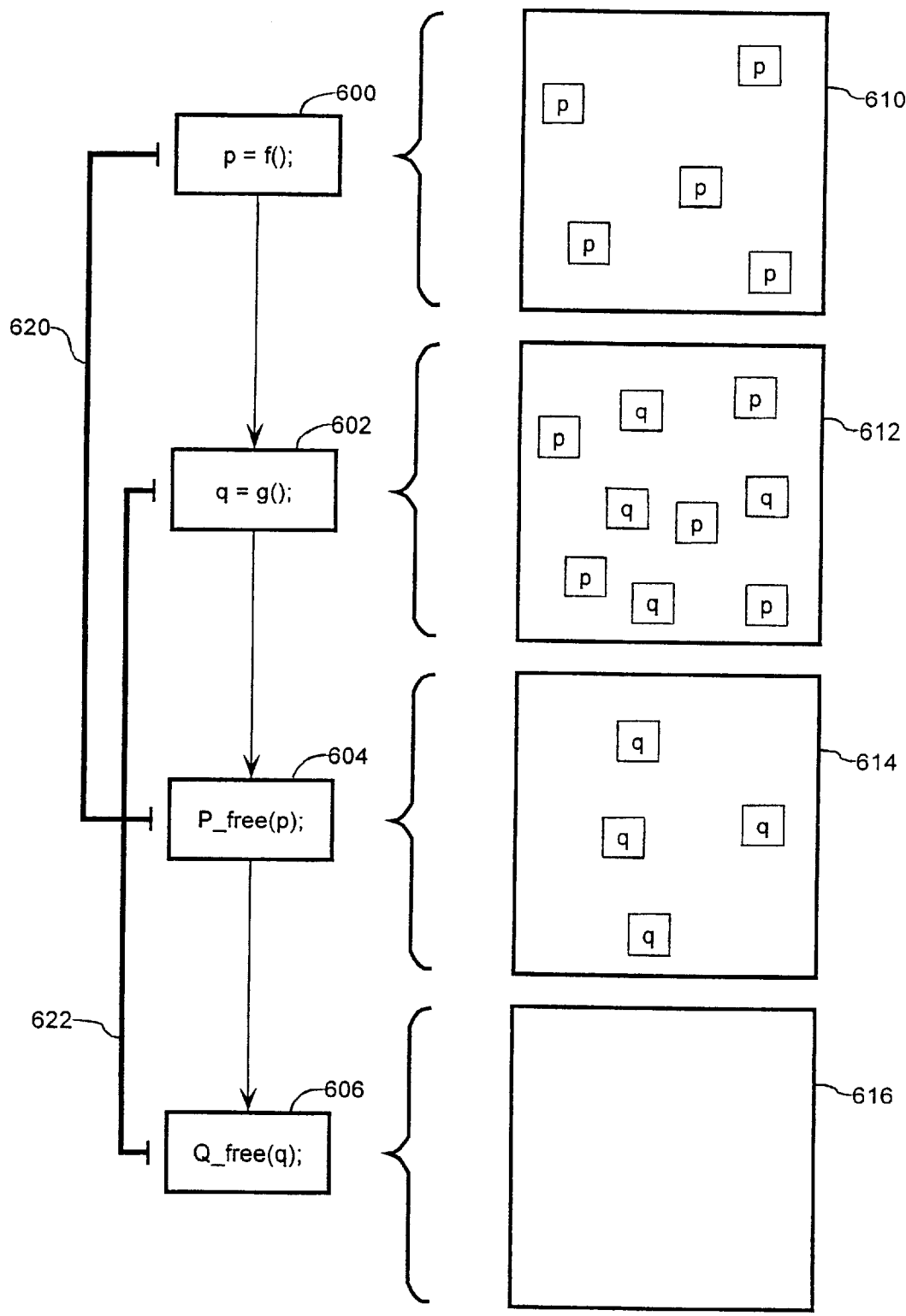
FIG. 6 depicts a sequence of memory allocations and deallocation and a corresponding heap in accordance a "per-object" deallocation approach.
Figure 7:
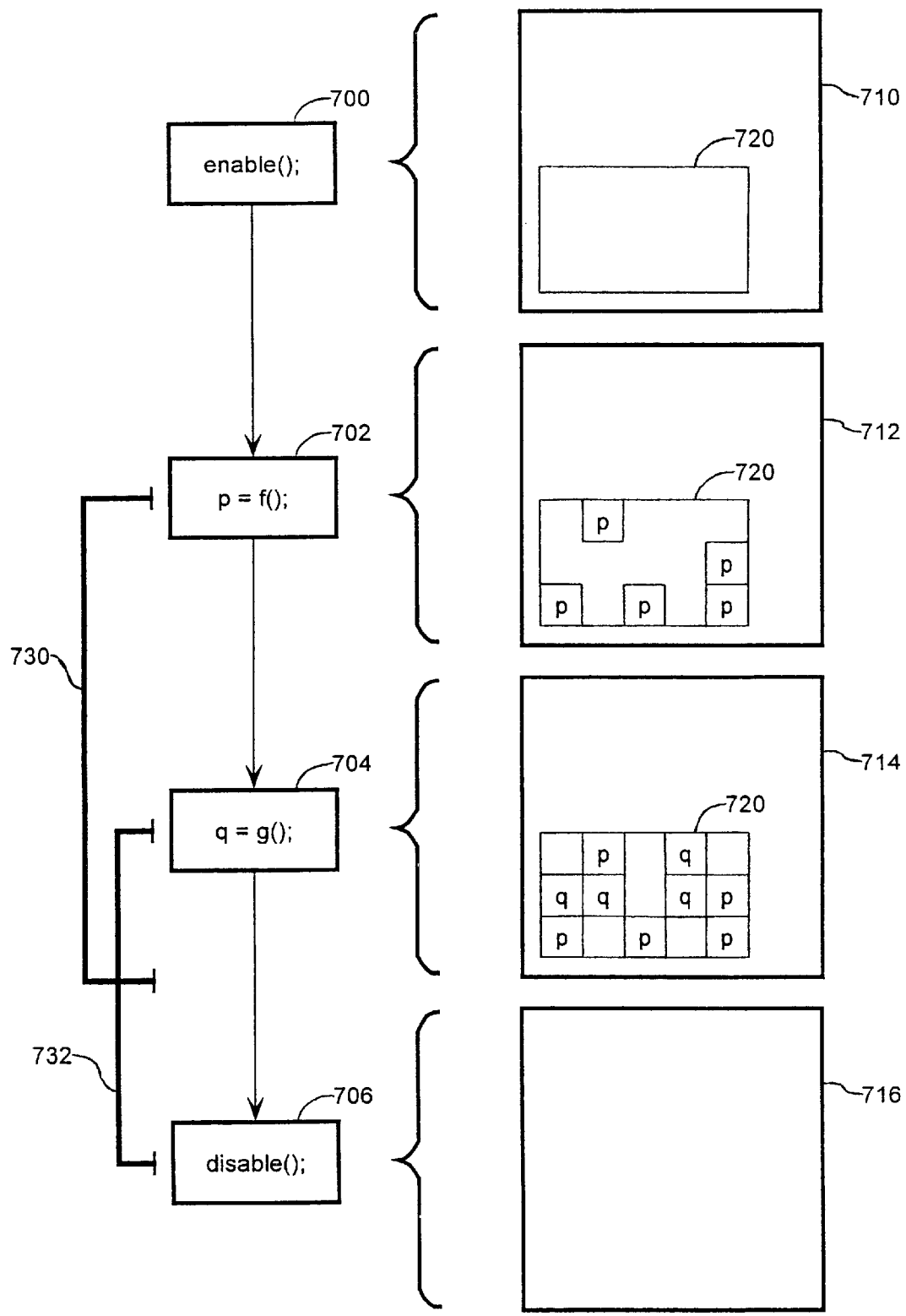
FIG. 7 depicts a sequence of memory allocations and deallocation and a corresponding heap in accordance a "per-client" deallocation approach.

The present invention has been found to be particularly advantageous in memory management for complex objects returned from remote procedure calls. A remote procedure call (RPC) is an invocation initiated by a process on one computer system of a routine to be executed on another computer system. FIG. 4 illustrates an exemplary remote procedure call from a client computer system 400 to a server computer system 430, and FIG. 5 is a flowchart of steps performed on the client 400 according to one embodiment. Client 400 includes client code 402, which uses Dynamic Memory Manager 404, a set of routines provided by the operating system, for allocating and freeing memory in associated heap 406. Client code 402, whose operations are illustrated in block 500, is configured to invoke remote procedure 408, which comprises components located on both client 400 and server 430.

Remote procedure 408 is produced from source files typically coded in one or more high-level computer languages. Typically, such source files include a remote procedure interface file 410, written in an appropriate specification language such as the Interface Description Language (IDL) defined for the Distributed Computing Environment (DCE) by the Open Software Foundation (OSF). The remote procedure interface file 410 includes a declaration of the remote procedure 408 specifying the name, arguments (or "in-parameters"), and results (or "out-parameters" indicated in FIG. 4 by an ampersand "&" prefix) and their types. The remote procedure 408 and type declarations are converted by an appropriate interface translator 412 into two routines: client stub 414 and server stub 416, also known as a skeleton. One example of an interface translation 412 includes an IDL compiler as front end to translate the remote procedure interface file 410 into high-level language statement in a programming language such as C, C++, and JAVA and then compile the statements into native machine language instruction or virtual machine bytecodes as appropriate.

Thus, client code 402 invokes remote procedure 408 by calling client stub 414 (step 502). Client stub 414 is a routine on client 400 produced by interface translator 412 and is linked with client code 402 to be callable therefrom. In accordance with an aspect of the invention, client stub 414 has been automatically generated by interface translator 412 to perform steps illustrated in block 510. More specifically, client stub 414 is configured to allocate a per-call pool 440 of dynamic memory from heap 406 and set up a call context ("ctx") including a reference to pool 440 (step 512). Furthermore, client stub 414 is generated to receive and marshal in-parameters passed by client code 402, for example arguments "a" and "b" for transmission to server 430 (step 514). Marshaling parameters is the process of converting the parameters into a linear sequence of bytes suitable for transmission to another site in a network. After the in-parameters have been marshaled, the client stub 414 is further configured to invoke services within client RPC module 418 to dispatch the marshaled parameters over a network connection 420 to server RPC module 422 on server 430 for further processing (also step 514). Server RPC 422 receives the information dispatched thereto from client 400, analyzes the information, and, in response, invokes the corresponding server stub 416.

Server stub 416 is a routine on server 430 also produced by interface translator 412 and is linked with manager code 424. Server stub 416 has been generated to unmarshal the transmitted parameters and invoke manager code 424 with the unmarshaled parameters. Manager code 424 is a routine produced from a remote procedure implementation source file 426 by an appropriate implementation source file translator 428, such as a C compiler that converts C sources files into object code. Manager code 424 is coded to implement the functionality of remote procedure 408, which in this example includes allocating by means of dynamic memory manager 432 memory in heap 434 for complex objects "c" and "d" and returning the complex objects as results.

These results, complex objects "c" and "d", are returned to server stub 416, which has been generated to marshal the results suitable for transmission back to client 400. Server RPC module 422 transmits the marshaled results across network communication 420 to client RPC module 418, which returns control to client stub 414. Client stub 414 unmarshals the transmitted results, allotting memory for complex objects from associated pool 440 (step 516). In the example, complex objects "c" and "d" are allotted memory from pool 440. These complex objects are passed back as results to client code 402 (steps 518 and 504).

At the end of the lifetime of the complex objects "c" and "d" (step 506), client code 402 is configured to free the complex objects "c" and "d" by a call to an exported routine in Client RPC Module 418, provided for deallocating a pool 440 associated with a remote procedure call. In one embodiment, the call context, initialized in the client stub 414 of the remote procedure call, is passed into a free_call( ) routine (block 520), whose main function is to identify the associated pool 440, e.g. by inspecting the reference to the pool 440 in the call context (step 532), and deallocate the pool (step 534).

One advantage of duration-based memory management in the context of remote procedure calls is that durations can overlap. Therefore, an application need not traverse the complex object to perform an expensive deep copy operation of a complex object returned from a client stub to make the complex object persist longer than the "per-client" memory management system. In addition, the complex object need not be traversed to free the complex as in the "per-object" approach, also computationally expensive.

Another advantage of performing "per-call" memory management in the context of remote procedure calls is that much of the memory allocation operations can be located in the routine that returns the complex objects. Since this routine, client stub 414, is automatically generated by an interface translator 412 based on an interface file 410, the opportunity for human error in coding the memory management instructions is greatly reduced.

While this invention has been described in connection with what is presently considered to be the most practical and preferred embodiment, it is to be understood that the invention is not limited to the disclosed embodiment, but on the contrary, is intended to cover various modifications and equivalent arrangements included within the spirit and scope of the appended claims.

What is claimed is:

1. A method of managing memory for a plurality of dynamically allocated, complex objects, said method comprising the computer-implemented steps of:
   (a) executing a first routine, which step includes the steps of:
   allocating a first pool of dynamic memory,
   allotting memory from said first pool for a first complex object, and
   returning said first complex object;
   (b) executing a second routine, which step includes the steps of:
   allocating a second pool of dynamic memory, other than said first pool,
   allotting memory from said second pool for a second complex object, and
   returning said second complex object;
   (c) releasing the memory for said first complex object by deallocating said first pool; and
   (d) releasing the memory for said second complex object by deallocating said second pool.

2. The method of claim 1, wherein said second pool is allocated after said first pool is allocated and before said first pool is deallocated.

3. The method of claim 2, wherein said second pool is deallocated before said first pool is deallocated.

4. The method of claim 2, wherein said second pool is deallocated after said first pool is deallocated.

5. The method of claim 1, further including the steps of maintaining said first pool of dynamic memory as a plurality of chunks of dynamic memory, said chunks including at least a prescribed number of bytes.

6. The method of claim 5, wherein the step of allotting memory from said first pool for a first complex object includes the steps of:
   receiving a request to allot a number of bytes of memory or at least a portion of said first complex object;
   determining whether one of said chunks has enough space to store said number of bytes;
   if one of said chunks has enough said space, then allocating said memory from said enough space; and
   if none of said chunks has enough said space, then allocating a new chunk of dynamic memory at least as large as said number of bytes and allocating said memory from said new chunk of memory.

7. The method of claim 1, wherein:
   the step of executing a first procedure call includes the step of executing a first remote procedure call; and
   the step of executing a second procedure call includes the step of executing a second remote procedure call.

8. A method of managing memory for a plurality of dynamically allocated, complex objects, said complex objects being created as a result of a plurality of remote procedure calls, said method comprising the computer-implemented steps of:
   allocating a plurality of pools of dynamic memory, each pool of said plurality of pools corresponding to one or more of said remote procedure calls;
   allotting memory for said complex objects, wherein each complex object is allocated memory within a pool that corresponds to the remote procedure that resulted in creation of the complex object; and
   releasing memory for said complex objects by deallocating the pools within which the complex objects were allocated;
   wherein the lifetime of one of said complex objects created in response to one of said remote procedure calls overlaps the lifetime of another of said complex objects created as a result of another of said remote procedure calls.

9. The method of claim 8, further comprising the step of establishing a plurality of call contexts referring respectively to said remote procedure calls; wherein:
   the step of allotting memory for said complex objects from corresponding pools of said pools includes the step of allocating memory for said complex objects from corresponding pools of said pools based on the respective call contexts; and
   the step of releasing memory for said complex objects by deallocating said corresponding pools includes the step of deallocating memory for said complex objects by deallocating said corresponding pools based on the respective call contexts.

10. The method of claim 8, further including the step of maintaining said pools of dynamic memory as respective pluralities of chunks of dynamic memory, said chunks including at least a prescribed number of bytes.

11. The method of claim 10, wherein the step of allotting memory for said complex objects from corresponding pools of said pools includes the steps of:
   receiving a request to allot a number of bytes of memory for at least a portion of said one of said complex objects;
   determining whether one of said chunks has enough space to store said number of bytes;
   if one of said chunks has enough said space, then allocating said memory from said enough space; and
   if none of said chunks has enough said space, then allocating a new chunk of dynamic memory at least as large as said number of bytes and allocating said memory from said new chunk of memory.

12. A method of translating a description of an interface for a remote procedure call, said method comprising the computer-implemented steps of:
   automatically generating a client stub routine for said remote procedure call based on said description, said client stub routine including instructions for:
      allocating a pool of dynamic memory,
      allotting memory from said pool for a complex object, and
      returning said complex object; and
   providing a memory deallocation routine including instructions for deallocating said pool.

13. The method of claim 12, wherein:
   said client stub routine further includes instructions for establishing a reference to said pool; and
   said memory deallocation routine further includes instructions for dereferencing said reference to identify said pool.

14. A computer-readable medium bearing instructions for managing memory for a plurality of dynamically allocated, complex objects, said instructions arranged, when executed, to cause one or more processes to perform the steps of:
   (a) executing a first routine, which step includes the steps of:
      allocating a first pool of dynamic memory,
      allotting memory from said first pool for a first complex object, and
      returning said first complex object;
   (b) executing a second routine, which step includes the steps of:
      allocating a second pool of dynamic memory, other than said first pool,
      allotting memory from said second pool for a second complex object, and
      returning said second complex object;
   (c) releasing the memory for said first complex object by deallocating said first pool; and
   (d) releasing the memory for said second complex object by deallocating said second pool.

15. The computer-readable medium of claim 14, wherein said second pool is allocated after said first pool is allocated and before said first pool is deallocated.

16. The computer-readable medium of claim 15, wherein said second pool is deallocated before said first pool is deallocated.

17. The computer-readable medium of claim 15, wherein said second pool is deallocated after said first pool is deallocated.

18. The computer-readable medium of claim 14, wherein said instructions are further arranged for performing the steps of maintaining said first pool of dynamic memory as a plurality of chunks of dynamic memory, said chunks including at least a prescribed number of bytes.

19. The computer-readable medium of claim 18, wherein the step of allotting memory from said first pool for a first complex object includes the steps of:
   receiving a request to allot a number of bytes of memory or at least a portion of said first complex object;
   determining whether one of said chunks has enough space to store said number of bytes;
   if one of said chunks has enough said space, then allocating said memory from said enough space; and
   if none of said chunks has enough said space, then allocating a new chunk of dynamic memory at least as large as said number of bytes and allocating said memory from said new chunk of memory.

20. The computer-readable medium of claim 14, wherein:
   the step of executing a first procedure call includes the step of executing a first remote procedure call; and
   the step of executing a second procedure call includes the step of executing a second remote procedure call.

21. A computer-readable medium bearing instructions for managing memory for a plurality of dynamically allocated, complex objects, said complex objects being created as a result of a plurality of remote procedure calls, said instructions arranged, when executed, for causing one or more processors to perform the steps of:
   allocating a plurality of pools of dynamic memory, each pool of said plurality of pools corresponding to one or more of said remote procedure calls;
   allotting memory for said complex objects, wherein each complex object is allocated memory within a pool that corresponds to the remote procedure that resulted in creation of the complex object; and
   releasing memory for said complex objects by deallocating the pools within which the complex objects were allocated;
   wherein the lifetime of one of said complex objects created in response to one of said remote procedure calls overlaps the lifetime of another of said complex objects created as a result of another of said remote procedure calls.

22. The computer-readable medium of claim 21, wherein said instructions are further arranged for performing the step of establishing a plurality of call contexts referring respectively to said remote procedure calls; wherein:
   the step of allotting memory for said complex objects from corresponding pools of said pools includes the step of allocating memory for said complex objects from corresponding pools of said pools based on the respective call contexts; and
   the step of releasing memory for said complex objects by deallocating said corresponding pools includes the step of deallocating memory for said complex objects by deallocating said corresponding pools based on the respective call contexts.

23. The computer-readable medium of claim 21, wherein said instructions are further arranged for performing the step of maintaining said pools of dynamic memory as respective pluralities of chunks of dynamic memory, said chunks including at least a prescribed number of bytes.

24. The computer-readable medium of claim 23, wherein the step of allotting memory for said complex objects from corresponding pools of said pools includes the steps of:

receiving a request to allot a number of bytes of memory for at least a portion of said one of said complex objects;

determining whether one of said chunks has enough space to store said number of bytes;

if one of said chunks has enough said space, then allocating said memory from said enough space; and if none of said chunks has enough said space, then allocating a new chunk of dynamic memory at least as large as said number of bytes and allocating said memory from said new chunk of memory.

25. A computer-readable medium bearing instructions for a description of an interface for a remote procedure call, said instructions arranged, when executed, for causing one or more processors for performing the steps of:

automatically generating a client stub routine for said remote procedure call based on said description, said client stub routine including instructions for:

allocating a pool of dynamic memory, allotting memory from said pool for a complex object, and returning said complex object; and providing a memory deallocation routine including instructions for deallocating said pool.

26. The computer-readable medium of claim 25, wherein:

said client stub routine further includes instructions for establishing a reference to said pool; and said memory deallocation routine further includes instructions for dereferencing said reference to identify said pool.

* * * * *